(12) United States Patent
Farahmand et al.

(10) Patent No.: US 7,420,918 B2
(45) Date of Patent: Sep. 2, 2008

(54) LOOK-AHEAD CONTENTION RESOLUTION METHOD FOR A BURST SWITCHING NETWORK

(75) Inventors: Farid Farahmand, Plano, TX (US); John Blanton, Dallas, TX (US); Dominique Verchere, Dallas, TX (US)

(73) Assignee: Alcatel Lucent, Paris (FR)

( * ) Notice: Subject to any disclaimer, the term of this patent is extended or adjusted under 35 U.S.C. 154(b) by 1048 days.

(21) Appl. No.: 10/328,354

(22) Filed: Dec. 23, 2002

(65) Prior Publication Data

US 2004/0120320 A1 Jun. 24, 2004

(51) Int. Cl.
*H04J 1/16* (2006.01)
*H04L 12/413* (2006.01)
*H04L 12/43* (2006.01)

(52) U.S. Cl. .................. 370/235; 370/447; 370/458

(58) Field of Classification Search ......... 370/229–230, 370/235, 431, 442, 445, 447, 458, 461–462, 370/498
See application file for complete search history.

(56) References Cited

U.S. PATENT DOCUMENTS

| | | | | |
|---|---|---|---|---|
| 4,754,451 | A * | 6/1988 | Eng et al. | 370/417 |
| 6,721,315 | B1 * | 4/2004 | Xiong et al. | 370/389 |
| 6,804,255 | B1 * | 10/2004 | Zheng et al. | 370/468 |
| 6,963,564 | B1 * | 11/2005 | Liu | 370/389 |
| 7,042,906 | B2 * | 5/2006 | Qiao et al. | 370/468 |
| 2002/0141398 | A1 * | 10/2002 | Qiao et al. | 370/360 |
| 2003/0198183 | A1 * | 10/2003 | Henriques et al. | 370/229 |
| 2004/0151115 | A1 * | 8/2004 | Poppe et al. | 370/230.1 |

OTHER PUBLICATIONS

Lizuka, et al.; A Scheduling Algorithm Minimizing Voids Generated by Arriving Bursts in Optical Burst Switched WDM Network; GLOBECOM '02; Nov. 2002; pp. 2736-2740; vol. 1.

Xiong, et al.; Control Architecture in Optical Burst-Switched WDM Networks; IEEE Journal on Selected Areas in Communications; Oct. 2000; pp. 1838-1851; vol. 18, No. 10.

Vokkarane, et al.; Burst Segmentation: An Approach for Reducing Packet Loss in Optical Burst Switched Networks; IEEE International Conference on Communications; Apr. 28-May 2, 2002; pp. 2673-2677; vol. 5.

Vokkarane, et al.; Generalized Burst Assembly and Scheduling Techniques for QoS Support in Optical Burst-Switched Networks; GLOBECOM '02; Nov. 2002; pp. 2747-2751; vol. 1.

* cited by examiner

*Primary Examiner*—Firmin Backer
*Assistant Examiner*—Nittaya Juntima

(57) ABSTRACT

A Look-ahead Contention Resolution ("LCR") technique for application in burst switching networks is described. The LCR technique takes advantage of the existing separation of data bursts and their BHPs in time (offset or "$\tau$"). Through a look-ahead window ("LAW") W time units wide, a network scheduler can process a group of BHPs prior to the arrival of their respective bursts and gain a collective knowledge of the state of the switch in the futures, rather than processing a single slot $\tau$ time units in the future.

9 Claims, 6 Drawing Sheets

LOOK-AHEAD CONTENTION RESOLUTION METHOD FOR A BURST SWITCHING NETWORK

CROSS-REFERENCE TO RELATED APPLICATION

This application discloses subject matter related to the subject matter disclosed in the following commonly owned, patent applications: U.S. patent application Ser. No. 10/328,613, entitled "SCHEDULING SYSTEM AND METHOD FOR A BURST SWITCH", filed Dec. 23, 2002 in the name(s) of: Prasad Golla, John Blanton, Gerard Damm, Dominique Verchere, Céline Haardt, and Farid Farahmand; and U.S. patent application Ser. No. 09/795,373, entitled "METHOD AND APPARATUS FOR SYNCHRONIZED SLOTTED OPTICAL BURST SWITCHING, filed Dec. 22, 2000 in the name of Heyun H. Liu.

BACKGROUND OF THE INVENTION

1. Technical Field of the Invention

The present invention generally relates to burst switching networks. More particularly, and not by way of any limitation, the present invention is directed a scheduling method for burst switching networks.

2. Description of Related Art

In burst switching technology, such as, in particular, optical burst switching ("OBS") technology, data bursts, each of which is made up of multiple packets, are switched optically at core nodes, or routers, in the OBS network. Assuming the data bursts are not buffered, the core node must have advance information on the data bursts to configure the switch. To provide this information, a small control packet, called the Burst Header Packet ("BHP") travels an offset time ahead of the data burst. The BHP includes information on when the data burst will arrive, the destination of the data burst, etc.

Contention may occur between multiple data bursts attempting to traverse the same egress link. Several distributed scheduling algorithms with different behaviors and complexities have been suggested for use in OBS networks. For example, the First-Fit, Horizon, an Horizon with Void Filling algorithms are among the most widely used technique. All of these techniques employ a similar contention resolution criterion based on dropping the data burst which has arrived latest. These techniques only consider data bursts in contention during one time slot. OBS network performance can be defined in terms of burst loss ratio, which is the percentage of bursts lost during scheduling. These existing scheduling algorithms are inefficient and result in high burst loss ratio in OBS systems since for example, the latest arriving data burst may be the longest data burst in contention.

Recently, some have proposed using variations of a contention resolution scheme known as segmentation along with the Horizon Void Filling algorithm to reduce burst packet dropping and improve bandwidth enforcement. Segmentation involves only dropping the portion of the latest arriving data burst which is in contention with other data bursts. This technique requires a complex data burst assembly and disassembly implementation process.

Therefore, what is needed is a contention resolution technique that reduces burst loss ratio in OBS networks.

SUMMARY OF THE INVENTION

Accordingly, the present invention provides method and apparatus for implementing a Look-ahead Contention Resolution ("LCR") technique. The scheduler gains a collective knowledge of the state of the data bursts over a period of time in the future. This is in contrast with other proposed scheduling algorithms in which the switch has prior knowledge of only a single slot in the future. The collective knowledge of the state of the data bursts may be gathered from BHP's arriving in advance of the data bursts or through any other means.

In one aspect, the invention comprises a method of scheduling data bursts in a burst switching network, wherein data bursts are communicated between nodes over one or more channels via fixed length slots, each burst occupying one or more slots in a channel, the method comprising the steps of determining a data burst window, wherein the data burst window includes a time period equal to a set number of slots and begins at a predetermined offset time period from a time t=0; determining whether a contention exists between data bursts within the data burst window because the data bursts occupy overlapping slots; and if a contention exists between data bursts, discarding one or more of the data bursts between which contention exists based on a shortest path analysis.

In another aspect, the invention comprises a method of scheduling data bursts through a router in a burst switching network, wherein data bursts are received by the router over a first set of plurality of optical transmission lines and are switched to a second set of optical transmission lines, wherein the data bursts are communicated over said first and second sets of optical transmission lines over one or more channels using synchronous fixed length slots, each burst occupying one or more slots in a channel, the method comprising the steps of determining a data burst window ("LAW"), wherein the data burst window includes a time period equal to a set number of slots and begins at a predetermined offset time period from a time t=0; determining a resolution region ("RR") within the data burst window, wherein the resolution region includes data bursts that only occupy slots completely within the boundary of the data burst window; determining whether a contention exists between data bursts within the RR because the data bursts occupy overlapping slots; and if a contention exists between data bursts, determining one or more data bursts to discard to drop the least amount of data within the RR.

In another aspect, the invention comprises a system for scheduling data bursts in a burst switching network, wherein data bursts are communicated between nodes over one or more channels via fixed length slots, each burst occupying one or more slots in a channel, the system comprising means for determining a look ahead window ("LAW") of burst header packets ("BHP"); means for determining a data burst window corresponding to BHP's within the LAW, wherein the data burst window begins at a predetermined offset from the LAW; determining whether a contention exists between data bursts within the data burst window because the data bursts occupy overlapping slots to a common egress port; and means responsive to existence of a contention between data bursts for discarding one of the data bursts between which contention exists.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
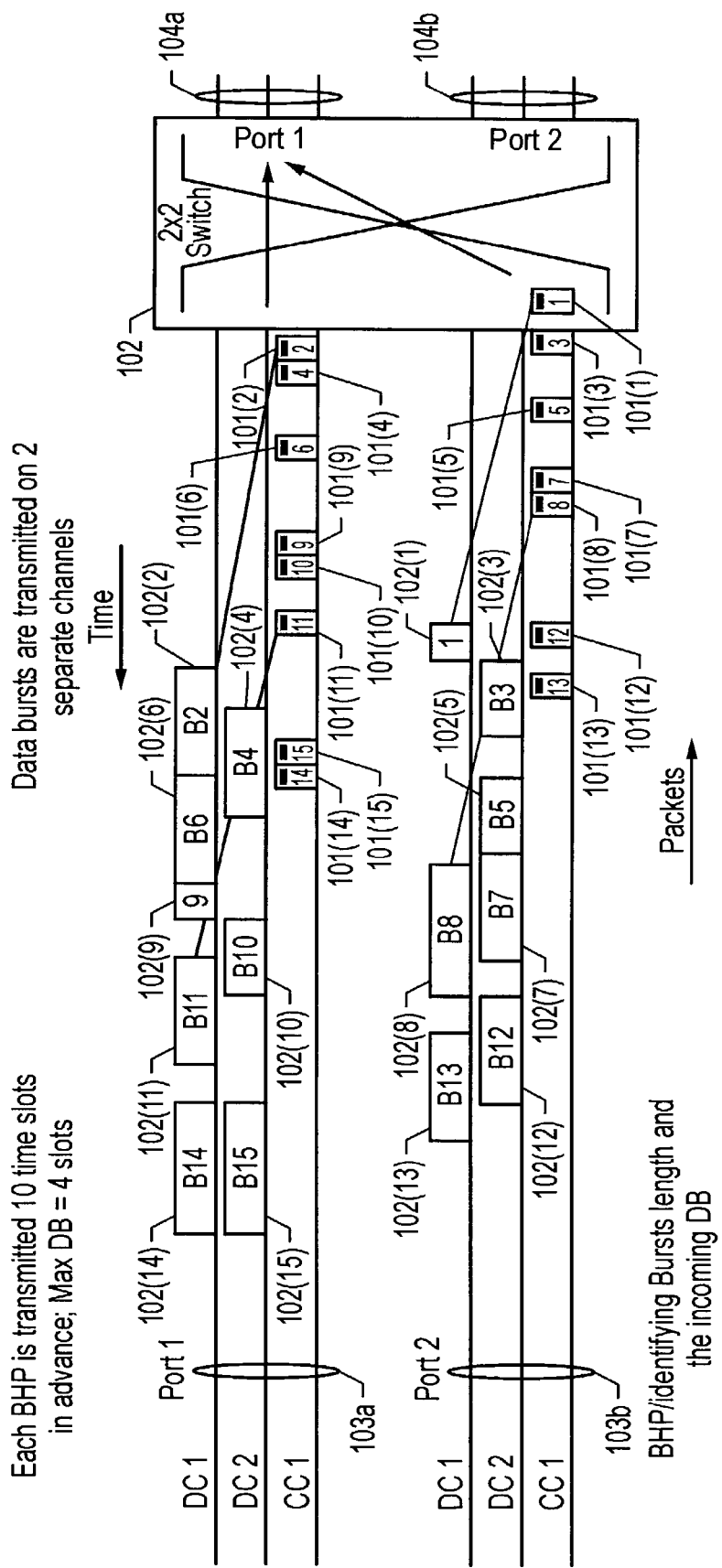
FIG. 1 illustrates BHPs and DBs arriving at a 2×2 optical switch within an OBS router.

In the drawings, like or similar elements are designated with identical reference numerals throughout the several views thereof, and the various elements depicted are not necessarily drawn to scale.

For simplicity and without loss of generality, this technique is described herein using an example in which bursts have variable lengths, there is no buffering, and slotted synchronous transmission with slot granularity is employed. It will be recognized, however, that these conditions are not necessary to the technique described herein. In addition, the example described below assumes that BHPs are received at a set offset time from data bursts on a separate control channel. Alternatively, advance information on data bursts may be received in any number of ways, including in-band signaling, a single control packet describing multiple data bursts, BHPs that arrive at varied offset periods, etc.

FIG. 1 illustrates the relative position of BHPs 101(1)-101(15) and corresponding DBs 1O1(1)-1O1(15) on different incoming channels. In the illustrated case, it will be assumed that a switch 102 within an OBS router has two incoming ports 103a, 103b, and two outgoing ports 104a, 104b. Each of ports 103a, 103b, 104a, 104b, includes two data channels, DC1, DC2, and a single control channel CC1. It will be further assumed that the maximum burst length ("Lmax") is 4 time slots.

In accordance with one embodiment, because BHPs are received prior to their respective DBs, it is possible to construct a look-ahead window ("LAW") of length W time slots to identify some of the incoming bursts $\tau$ time slots in the future. It will be assumed for the sake of example herein that W is equal to 2*Lmax, where Lmax is the maximum burst length.

Figure 2A:
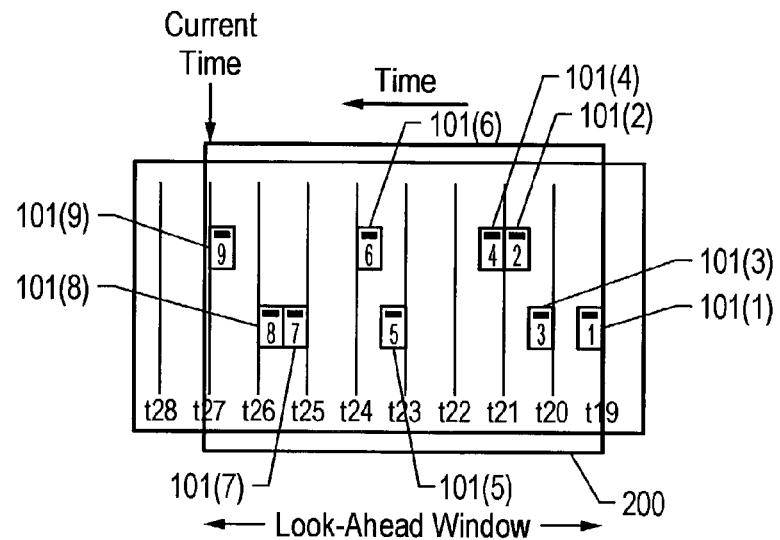
FIGS. 2A and 2B respectively illustrate a Look-Ahead Window and a Burst Window and Resolution Region in accordance with one embodiment.
Figure 2B:
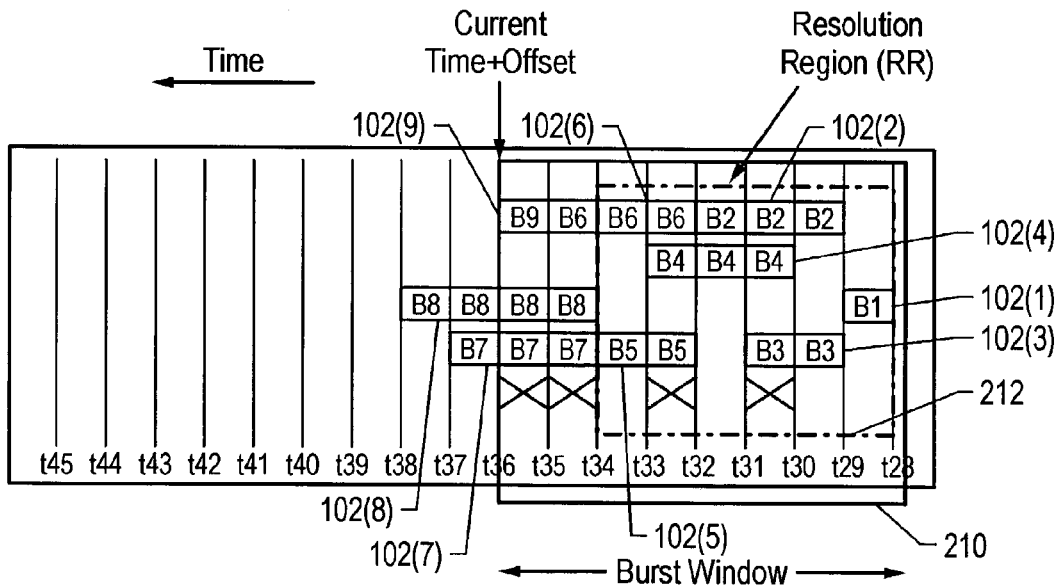

FIG. 2A illustrates an example of the received BHPs on all control channels destined for the same output port, such as the output port 104a (FIG. 1) within a LAW 200, in this case W=eight time slots wide. In the embodiment illustrated in FIG. 2A, the LAW 200 extends from t19 to t27. An offset ("$\tau$") of 9 time slots between the BHPs 101(1)-101(15) and their corresponding DBs 102(1)-102(15) will be assumed for this example. Accordingly, using the BHP information illustrated in FIG. 2B, a data Burst Window ("BW") 210 of length W, as shown in FIG. 2B, can be constructed for an offset time $\tau$ later ([t19-t27]+9 or [t28-t36]). The beginning and end points in time of the BW 210 are specified by TSo and TSw, respectively, where the difference of Tso and TSw equals W. As shown in FIG. 2B, TSo=t28 and TSw=t36. The BW 210 includes the DBs 102(1)-102(15) corresponding to the BHPs 101(1)-101(15) of the LAW 200 (FIG. 2).

Again, creation of the LAW from BHPs is just one method of constructing a burst window of data bursts that will arrive during a future predetermined time period in advance of t=0. Other methods may be used to construct the burst window. However, it is important that the beginning of the burst window must be sufficient in advance to process the contention resolution scheme and configure the switch.

Once the DB arrival times within a Burst Window 210 are determined, as shown in FIG. 2B, a Resolution Region ("RR") 212 may be defined in which heuristic decisions can be made with respect to the DBs to avoid contention. The beginning and end points of the RR are TSo and TSr, respectively. TSo will always be the same as the starting point of the BW 210. In one embodiment, TSr is defined as the earliest point in which a DB whose length extends beyond the BW 210 arrives. Accordingly, in the example illustrated in FIGS. 2A and 2B, the RR 212 ranges from t28 to t34. This point can be determined as follows. This point can be determined as follows. First, B is set equal to {Bi(L,ts)}, where Bi is a burst within the BW with duration L and starting time ts. A set V comprising all bursts extending beyond the burst window boundary is identified. In particular, V={Bj(Lj, tsj)|(Lj+tsj>TSw)}; V$\subset$B. Next, the DB within the set V that has the smallest starting time is identified. In particular, TSr=min (tsj|Bj$\in$V); (TSr$\leq$TSw). Finally, the boundaries of the Resolution Region are set to [TSo-TSr].

The contention resolution technique can be applied only to those DBs within an RR, such as the RR 212. In this situation, the LAW 200, and hence the BW 210, can be advanced by the entire width of the RR. For example, referring to FIG. 2B, it will be noted that the RR 212 as illustrated therein ranges from t28 to t34. Once contention resolution is performed for the DBs therewithin (i.e., DBs 102(1)-102(6)), the LAW, and hence the BW, can be advanced the entire width of the RR, or six time slots. Thus, the next BW (and hence RR), can start at t34. Alternatively, the BW 210 can be advanced by only one time slot and the contention resolution performed again for DBs within the RR.

Another method besides the RR can also be used to define the range in which the contention resolution technique can be applied within the BW 210. The contention resolution technique can be applied to all DBs within the entire BW, in which case the BW essentially functions as the RR. It will be recognized, however, that in this case, definite decisions can only be applied to DBs with starting time equal to TSo and the LAW 200 (and accordingly, the BW 210) may therefore be advanced only one slot at a time. For purposes of illustration, the method in which the RR is coextensive with the BW and in which the LAW and BW are advanced a single time slot at a time, will be described hereinbelow with reference to FIGS. 3A-3D.

Figure 3A:
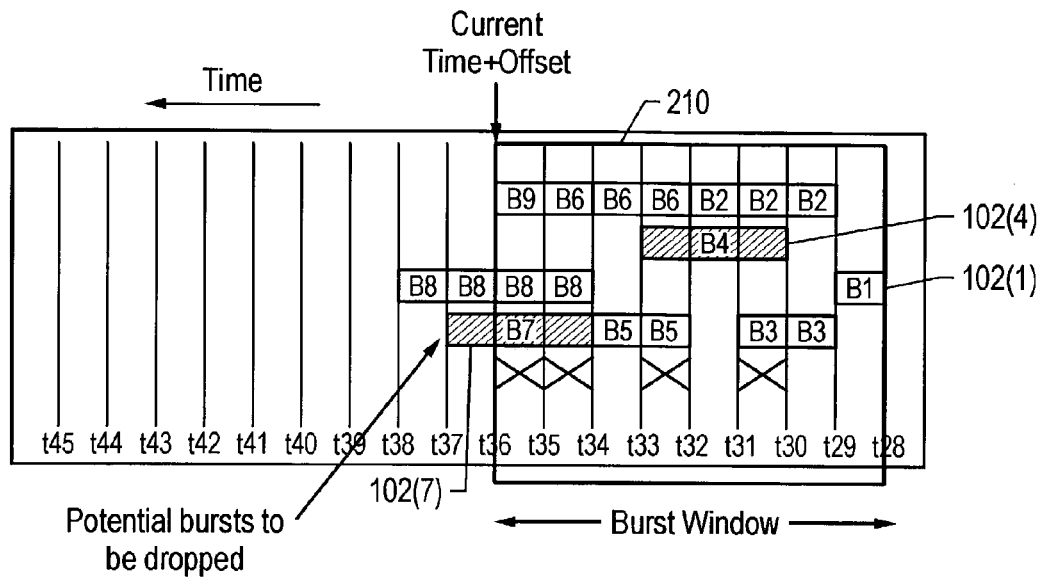
FIGS. 3A-3D illustrate a Look-Ahead Contention Resolution ("LCR") technique in accordance with one embodiment.

FIG. 3A is identical in all respects to FIG. 2B, except that in FIG. 3A, the RR 212 of FIG. 2B is not represented. This is due to the fact that, as previously indicated, the example illustrated in FIGS. 3A-3D presupposes that contention resolution technique described hereinbelow is applied to all of the DBs within the BW 210. As discussed above, the burst window in FIG. 3A may be constructed from BHPs in a LAW such as that shown in FIG. 2A or by some other method to gather advance information on the data bursts. Referring to FIG. 3A, it will be noted that, with N=2 available data channels on each of two links, some time slots experience contention. Specifically, three contention regions ("CRs") can be defined: CR={CR1, CR2, CR3}, where CR1=[t30-t31], CR2=[t32-t33], and CR3=[t34-t36]. The contention region CRx is defined as a series of consecutive time slots that have some degree of contention. Although the contention resolution technique solves contention for the entire BW 210, only those DBs with starting points equal to TSo are discarded at any given time in this example.

In FIG. 3A, DBs 102(4) and 102(7) are shaded to indicate that they are potential DBs to be dropped. Selection of these DBs will be discussed in greater detail with reference to FIGS. 4 and 5. It will be noted that a definite decision cannot be made with respect to dropping either of the DBs, as the starting points thereof are not yet equal to TSo, which in FIG. 3A is equal to t28. The only DB with a starting point equal to TSo is DB 102(1) which, because it is not in a contention region, can be scheduled.

Figure 3B:
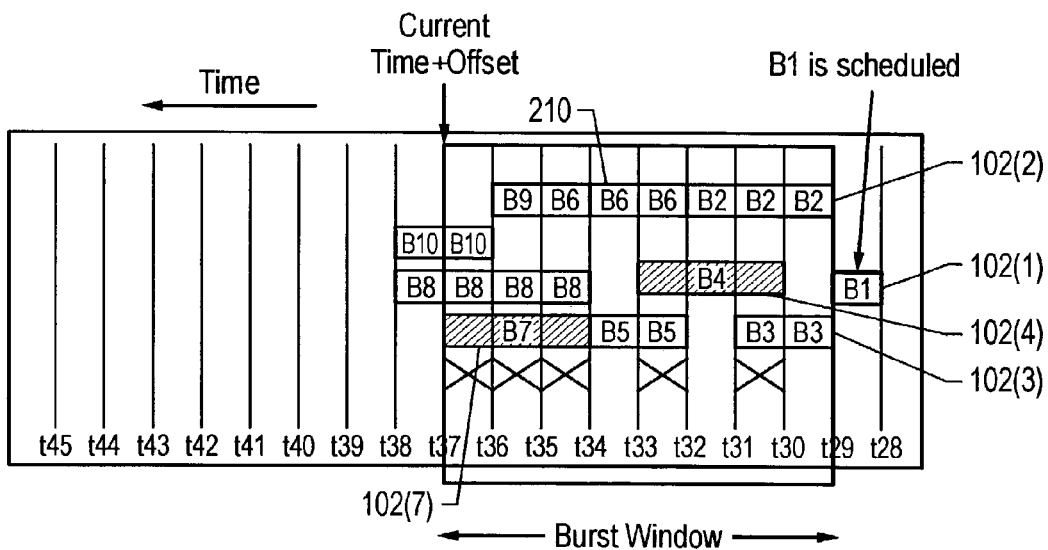

The BW 210 (and the effective RR) is moved one time slot with boundaries [t29-t37]. As shown in FIG. 3B, the DB 102(1) is scheduled. Three CRs are defined: CR={CR1, CR2, CR3}, where CR1=[t30-t31], CR2=[t32-t33], and CR3=[t34-t37].

Again, DBs 102(4) and 102(7) are shaded to indicate that they are potential DBs to be dropped, but again, a definite decision is not made with respect to dropping either of the DBs, as the starting points thereof are not yet equal to TSo, which in FIG. 3B is equal to t29. There are now two DBs with starting points equal to TSo: DB 102(2) and DB 102(3) which, because they are not indicated as being considered for dropping, can be scheduled.

Figure 3C:
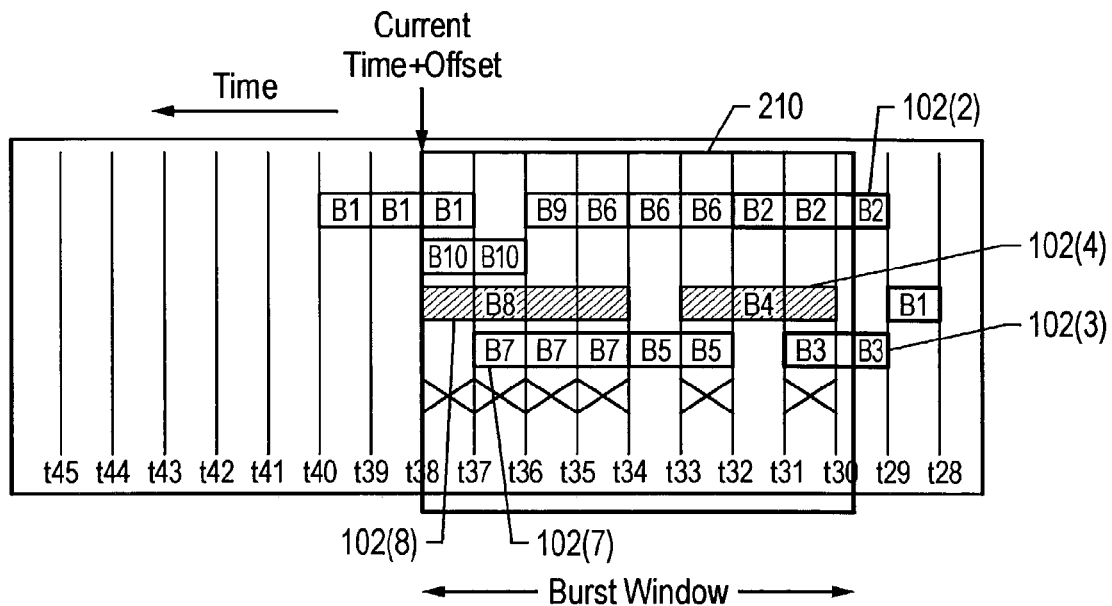

Referring now to FIG. 3C, the BW 210 210 (and the effective RR) is moved one time slot, such that its boundaries are now [t30-t38]. As shown in FIG. 3C, the DB 102(2) and the DB 102(3) have completed the process and are scheduled. Three CRs are defined: CR={CR1, CR2, CR3}, where CR1=[t30-t31], CR2=[t32-t33], and CR3=[t34-t38].

DB 102(4) is again shaded to indicate that it is a potential DB to be dropped; however, the DB 102(7) has been removed from consideration for dropping and the DB 102(8) is now being considered in its place. This illustrates the reason that a definite decision with regard to dropping a DB should not be made with respect to a DB whose starting point is not equal to TSo, which in FIG. 3C is equal to t30. In this case, because the starting point of DB 102(4) is equal to TSo, a decision can be made to drop the DB. Moreover, DB 102(2) and 102(3) are scheduled.

Figure 3D:
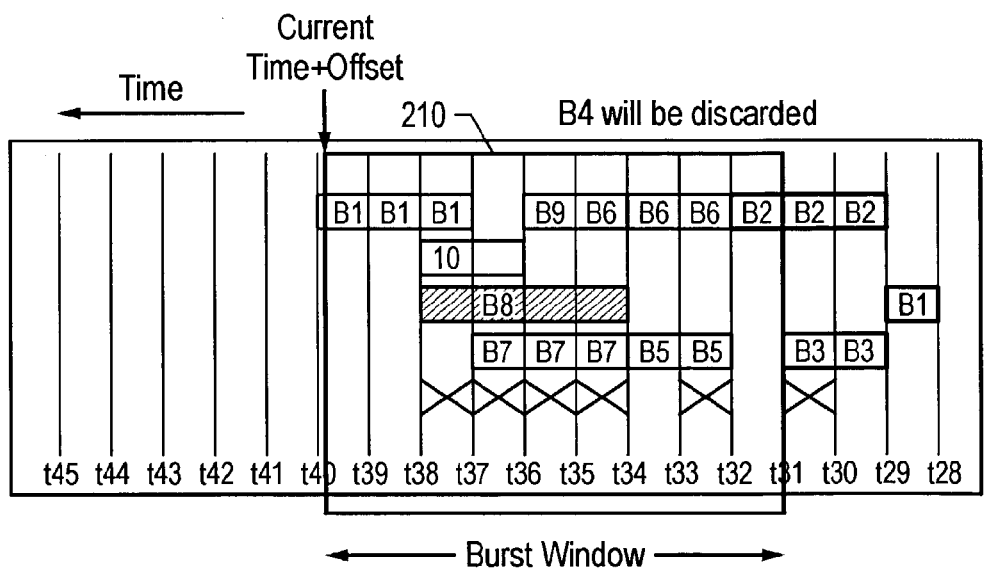

Referring now to FIG. 3D, the BW 210 (and the effective RR) is moved one time slot, such that its boundaries are now [t31-t39]. As shown in FIG. 3D, the DB 102(4) was not granted a reservation and is therefore discarded.

In this example, only those DBs with staffing points equal to TSo are discarded at any given time. In an alternate embodiment described above, the contention resolution technique can be applied to all the DBs within a Resolution Region, such as the RR 212 shown in FIG. 2B. In this situation, the burst window can be advanced by the entire width of the RR and the data bursts dropped before t=TSo.

It will be noted that the offset time between the BHP and its DB needs to be long enough to guarantee that the DB will not arrive before processing of its BHP has been completed; that is, τ must be greater than or equal to W. In the illustrated example, W=8 and τ=9, so the condition is met.

Conceptually, the LCR technique can be divided into three basic steps, including (1) constructing a burst window of data bursts to arrive at an offset time τ that are destined to the same output port or egress link; (2) determining the contention regions ("CRx") and defining the RR in each BW; and (3) applying heuristics to determine which of the contending burst packets within each CR within the RR (or BW) must be discarded. The first two steps will be described in greater detail below with reference to FIG. 4. The third step will be described in greater detail below with reference to FIG. 5.

Figure 4:
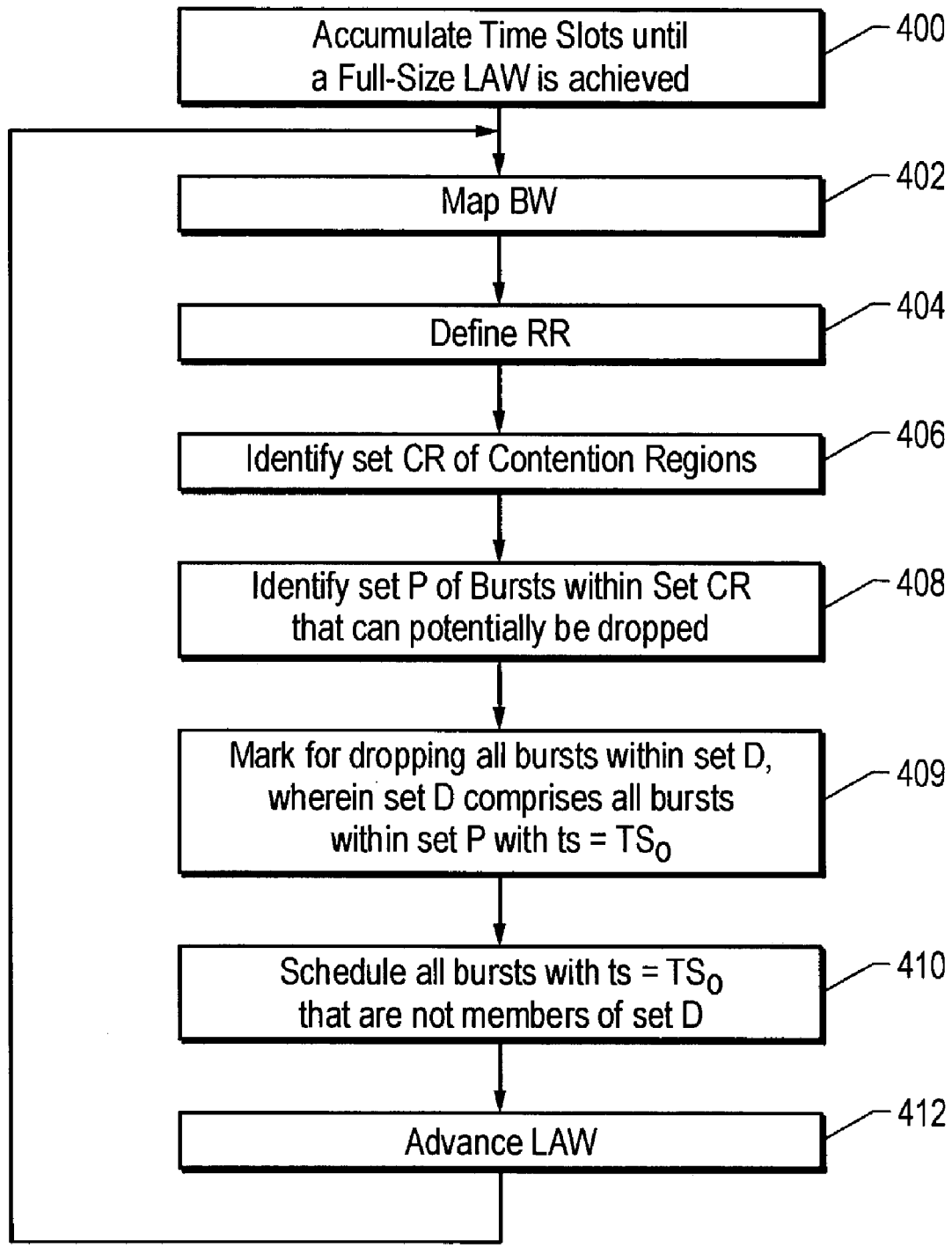
FIGS. 4 and 5 are flowcharts of the operation of the LCR technique of one embodiment.

Referring now to FIG. 4, it will be assumed that data for a burst window is constructed from a LAW of length W as shown in FIG. 2A, where W=2*Max_Burst_Length=2*Lmax. The LAW is constructed from BHPs that are received in advance of the data bursts by an offset time τ. In step 400, time slots are accumulated from a current time until a full size (i.e., W-time slots) LAW is achieved. In step 402, a BW for bursts addressed to a specific output port or egress link is mapped from the data in the BHPs in the LAW. In particular, the boundaries of the BW are [TSo-TSw], where TSo=Current Time+Offset (τ) and TSw=TSo+W. In step 404, within the BW, the RR is defined. In the embodiment illustrated in FIGS. 3A-3E, the RR is defined to be identical to the BW.

In an alternative embodiment, the boundaries of the RR are [TSo-TSr], where TSr is defined as the earliest point in which a DB whose length extends beyond the boundary of BW (i.e., beyond TSw) arrives. This point can be determined mathematically as explained previously.

In step 406, all contention regions within the RR are identified. In particular, CR={CR1, CR2, ... CRu}, where u≦W/2. Accordingly, in the example described herein, u≦4. In step 408, contention regions within RR are resolved by identifying a set P of DBs that can potentially be discarded, or dropped. In step 409, a set D of DBs that can be marked for drop is identified. In particular, the set D comprises DBs that are members of the set P and that have ts=TSo. Steps 408 and 409 are described in greater detail in FIG. 5 below.

In step 410, DBs with starting time ts=TSo and not marked to be dropped are scheduled. In step 412, the LAW is advanced. In the embodiment described herein, the LAW is advanced one time slot; that is, TSo=TSo+1. In an alternative embodiment, the LAW may be advanced the entire width of the LAW; that is, TSo=TSo+W. Execution then returns to step 402.

Once the data burst window is constructed and the arrival times of the incoming DBs along with the respective durations thereof are determined, the contention resolution problem can be reduced to the following: if there are more than N bursts directed to the same output port on the switch (where N is the number of available data channels on the port), how can contention be optimally resolved by minimizing the BLR?

One method is to use a shortest data burst policy in which the shortest data burst in a contention region CR is dropped. However, the shortest data burst policy does not always minimize the data dropped. Dropping a longer data burst may be more optimal if two or more CRs within the data burst window are alleviated by dropping the longer burst. Instead, a centralized shortest path algorithm is used to find minimum amount of data that must be dropped such that there are no more port contentions.

The content of the data burst window can be represented by a directed graph, or "digraph", G=(n,A). The parameter n is defined as the set of (ts(i), te(i)), where ts(i) and te(i) are the starting and ending times, respectively, of a burst i ("Bi"). A represents a collection of ordered pairs of distinct nodes from n with a weight equivalent to the duration of Bi ("LBi").

Given a set of contention regions CR={CR1, CR2, ... CRu} within the data burst window, where CRi=[ts(m)–te(n)], the shortest path problem is simply to find the shortest path p going through the set of contention regions CR. To solve the shortest path problem, the original digraph G must be altered such that it is connected. Accordingly a series of simple rules have been developed in order to interconnect the adjacent nodes in the digraph G. Details of these rules are provided in FIG. 5 below. The resulting digraph G'=(n,A') can be solved for contention using the standard shortest path problem algorithms.

Figure 5:
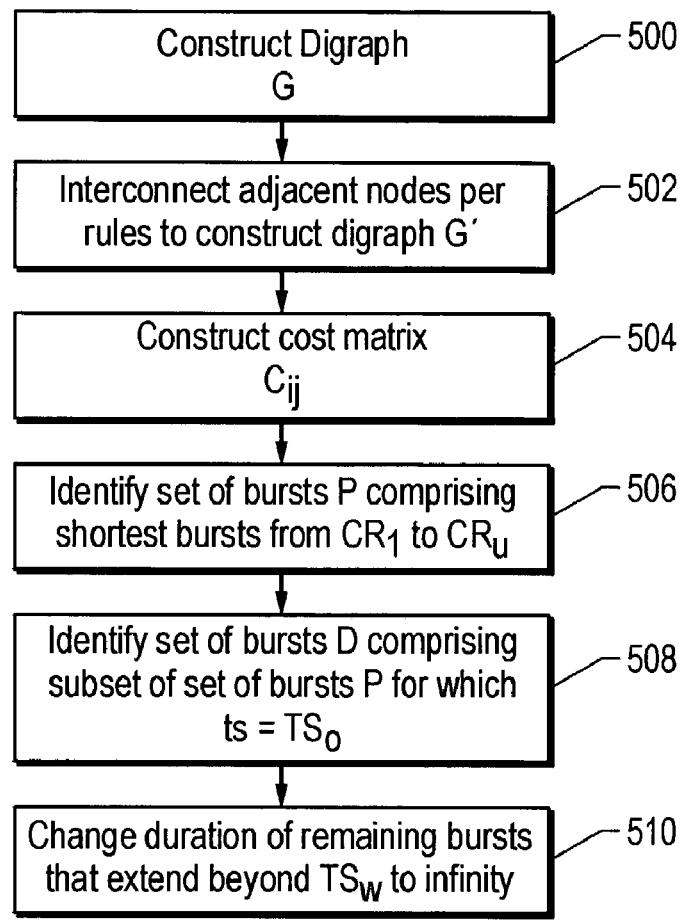

Referring to FIG. 5, in step 500, a digraph G is constructed using the BW. In this step, a node is assigned to each time in the BW with a starting or ending time of a burst Bi. An path is constructed between each beginning node and ending node of a burst Bi and assigned a value equal to the burst duration Bi. In step 502, certain of the adjacent nodes are interconnected. In particular, directed zero path connections $Z_{k, k+1}$ and $Z_{k+1, k}$, are added between all adjacent node pairs [(k, k+1) and (k+1, k)] within the BW. However, $Z_{k, k+1}$ and $Z_{k+1, k}$ are removed if node k is the starting node of a contention region and $Z_{k, k-1}$, and $Z_{k-1, k}$ are removed if node k is the ending node of a contention region. $Z_{k, k+1}$ is removed if node k is within a contention region. Thus, adjacent node pairs are not connected that represent times between contention regions. A negative path $N_{k+1, k}$ is assigned from k−1 to k if node k is within a contention region. $Z_{k, k+1}$ is replaced with any non-zero-directed path from k to k+1.

In step 504, a cost matrix Cij is generated for the directed graph G. In step 506, using a shortest path algorithm, such as Dijkstra's or Bellman-Ford, the shortest bursts from CR1 to CRu are located. In this step P={Bi, Bj, ... }. In step 508, the subset of bursts in P is located such that their starting point is TSo and those bursts are marked to be dropped. In this step D={Bj (L,ts)|(tsj=TSo)}; D⊂P and thus D⊂B. In step 510, the duration of the remaining bursts that extend beyond TSw is changed to infinity so that they are not discarded in the next BW.

Figure 6:
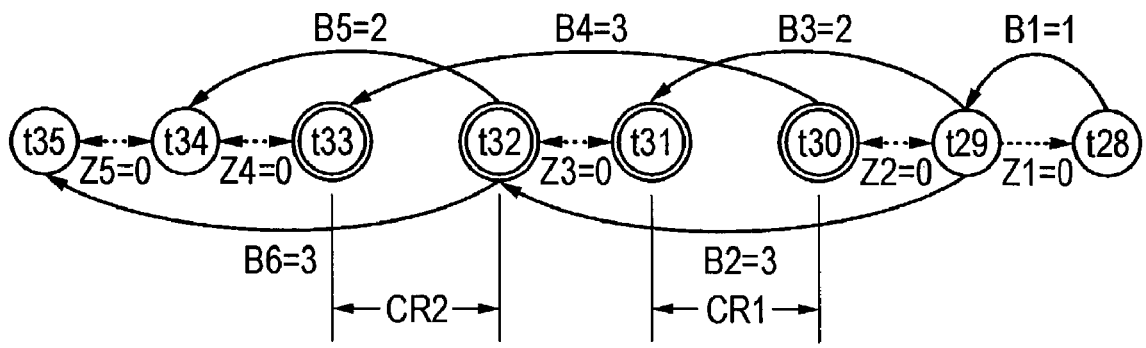
FIG. 6 illustrates a directed graph constructed in accordance with the LCR technique of one embodiment.

The approach illustrated in FIG. 5 can be demonstrated with reference to the example illustrated in FIG. 3A. First, a directed graph G=(n,A) is created. The set of bursts within the burst window 210 is represented by B={B1, B2, ... Bq}, where q=9. Thus, there will be nine arcs with 11 distinct nodes in G. Each arc $(t_s(i), t_e(i))$ is assigned a weight representing the burst duration LBi. Consequently, n={t28, t29, t31 ... t38} and A {(t28, t29), (t29, t31), t29, t32) ... }. In this case, CR1={t30, t31), CR2=(t32, t33), and so on. Solving for p, as shown in FIG. 5, provides D={B4, B7}. It will be noted that none of these burst have a start time ("ts") of TSo. Therefore, no burst will be dropped and LAW is advanced by one slot. The resulting directed graph G is shown in FIG. 6.

The zero-path connections between adjacent nodes, as described in FIG. 5, step 502, are required for graph connectivity purposes. This is because in many cases, the contention regions may be disjoint from one another. On the other hand, within a contention region, adjacent nodes may not be connected. In addition, the need for assigning negative-directed paths between consecutive nodes within the CRx is to ensure that the overlapping bursts between two nodes are removed prior to a single burst with the same length. This can be illustrated by way of example.

After a directed graph is generated, a shortest path algorithm is run to find the smallest burst involved in the contention. In this case, the length of B1 and B2+B3 is the same, so it appears that there is no difference between removing either set. However, if B1 is removed, there will still be contention between nodes 4 and 3. To avoid such cases, priority is give to cases in which bursts overlap each other (i.e., B2 and B3).

This technique also provides better fairness in terms of dropping bursts with different source-to-destination paths. The value of the negative-directed path $N_k$ can be a fraction of a unit (e.g., −0.01).

Once a connected digraph G'=(n,A') is defined, its associated distance matrix $C_{ij}$ can be constructed. Note that if (i,j) is not an arc of the digraph G', $d_{ij}$ is denoted as infinity. The computational complexity involved in finding the shortest set of bursts in each window depends on the choice of the shortest path algorithm. Variants of the Bellman-Ford and Dijkstra's algorithms appear to be practical and efficient.

Accordingly, the present invention advantageously provides method and apparatus for implementing a Look-ahead Contention Resolution ("LCR") technique. The LCR technique takes advantage of the existing separation of data bursts and their BHPs in time (offset or "τ"). Through a look-ahead window ("LAW") as wide as W time units, the scheduler can process BHPs prior to the arrival of their respective bursts and gain a collective knowledge of the state of the switch in the futures. This is in contrast with other proposed scheduling algorithms in which the switch has prior knowledge of only a single slot τ time units in the future. The invention then processes the contentions within the constructed burst window and eliminates the contentions while minimizing the data that must be dropped.

It should be noted that the embodiments described herein are particularly applicable to systems in which data burst size is variable and in which there is a lack of means for buffering the data bursts. Additionally, the embodiments apply when the offset τ is variable and whether or not the data bursts are slotted.

Moreover, the embodiments described herein are applicable to various forms of burst switching networks independent of the transport medium employed. In particular, the embodiments may be applied to Electronic Burst Switching ("EBS"), Advanced Manufacturing Systems ("AMS") and Radio Burst Switching ("RBS") networks.

Based upon the foregoing Detailed Description, it should be readily apparent that the present invention advantageously provides an innovative and efficient solution for implementing an LCR technique in an OBS network. The LCR described herein is a generic mechanism that can be applied in conjunction with many other scheduling algorithms, such as segmentation or others. Additionally, the LCR is potentially useful in applications with quality of service ("QoS") requirements. Moreover, the LCR technique is not constrained to any particular transmission scheme (e.g., slotted or non-slotted) and it can be employed for a switching system with or without Fiber Delay Lines ("FDLs"), or optical buffers. In addition, having constant or variable offset size has no bearing on the functionality of the LCR technique.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A method of scheduling data bursts in a burst switching network, wherein data bursts are communicated between nodes over one or more channels via fixed length slots, each burst occupying one or more slots in a channel, the method comprising the steps of:

determining a data burst window ("BW") of data bursts addressed to a common destination, wherein the BW includes a time period equal to a set number of slots and begins at a predetermined offset time period from a time t=0;

determining a resolution region ("RR") within the BW, wherein the resolution region includes data bursts that only occupy slots completely within the boundary of the BW;

determining whether a contention exists between data bursts within the BW and determining whether the contention exists between data bursts within the RR; and if a contention exists between data bursts within the RR, identifying one or more of the data bursts to be dropped using a shortest path analysis.

2. The method of claim 1 further comprising the steps of:

advancing the BW by one slot; and repeating the steps of determining whether a contention exists and identifying one or more data bursts to drop.

3. The method of claim 1 further comprising the steps of:

advancing the BW by the set number of slots; and repeating the steps of determining whether a contention exists and identifying one or more data bursts to drop.

4. A method of scheduling data bursts through a router in a burst switching network, wherein data bursts are received by the router over a first set of plurality of optical transmission lines and are switched to a second set of optical transmission lines, wherein the data bursts are communicated over said first and second sets of optical transmission lines over one or more channels using synchronous fixed length slots, each burst occupying one or more slots in a channel, the method comprising the steps of:

determining a data burst window ("BW"), wherein the BW includes a time period equal to a set number of slots and begins at a predetermined offset time period from a time t=0;

determining a resolution region ("RR") within the BW, wherein the resolution region includes data bursts that only occupy slots completely within the boundary of the BW;

determining whether a contention exists between data bursts within the RR because the data bursts occupy overlapping slots; and if a contention exists between data bursts, determining a data burst to be discarded between which contention exists that minimizes data loss.

5. The method of claim 4 wherein a starting point of the RR is equal to a starting point of the BW and an ending point of the RR is equal to a starting point of a first data burst within the BW and having an ending point that lies outside the BW.

6. The method of claim 4 wherein the step of determining a data burst to be discarded comprises discarding the shortest one of the data bursts between which contention exists.

7. The method of claim 4 further comprising the steps of:

advancing the BW by one slot; and repeating the steps of determining an RR, determining whether a contention exists, and determining a data burst to discard.

8. The method of claim 4 further comprising the steps of:

advancing the BW by the set number of slots; and repeating the steps of determining an RR, determining whether a contention exists, and determining a data burst to discard.

9. The method of claim 4, further comprising the step of discarding one of the data bursts only if a starting point thereof is equal to a starting point of the RR.

* * * * *